United States Patent [19]

Sekmakas et al.

[11] 4,321,176
[45] Mar. 23, 1982

[54] EMULSION POLYMERIZATION IN WATER-INSOLUBLE POLYOL

[75] Inventors: Kazys Sekmakas, Palatine; Raj Shah, Schaumburg, both of Ill.

[73] Assignee: DeSoto, Inc., Des Plaines, Ill.

[21] Appl. No.: 111,076

[22] Filed: Jan. 10, 1980

[51] Int. Cl.$^3$ ............................................. C08F 2/26
[52] U.S. Cl. ......................... 524/555; 524/558; 524/559; 524/560; 524/563; 524/556; 524/566; 524/577; 428/457; 428/463
[58] Field of Search ............... 260/29.6 TA, 29.6 H, 260/29.6 E; 526/209

[56] References Cited

U.S. PATENT DOCUMENTS

| | | | |
|---|---|---|---|
| 3,300,439 | 1/1967 | Chloupek | 526/303 X |
| 3,352,806 | 11/1967 | Hicks | 525/378 X |
| 3,650,998 | 3/1972 | Sekmakas | 260/29.6 H |
| 3,746,671 | 7/1973 | Zima | 260/29.6 MQ |
| 4,005,052 | 1/1977 | Sekmakas | 260/29.6 H |
| 4,057,527 | 11/1977 | Columbus | 260/29.6 TA |
| 4,059,665 | 11/1977 | Kelley | 260/29.6 TA |
| 4,065,415 | 12/1977 | Christenson | 260/29.6 TA |
| 4,065,416 | 12/1977 | Christenson | 260/29.6 TA |
| 4,070,319 | 1/1978 | Carel | 260/29.6 TA |
| 4,077,932 | 3/1978 | Columbus | 260/29.6 TA |
| 4,097,438 | 6/1978 | Christenson | 260/29.6 UA |
| 4,172,064 | 10/1979 | Keller | 260/29.6 TA |
| 4,193,902 | 3/1980 | Mondt | 260/29.6 TA |

*Primary Examiner*—C. A. Henderson
*Attorney, Agent, or Firm*—Dressler, Goldsmith, Shore, Sutker & Milnamow, Ltd.

[57] ABSTRACT

A method of forming a latex coating composition is disclosed in which there is first formed an aqueous emulsion of liquid droplets of water-insoluble polyol, such as a propylene oxide adduct of bisphenol. A, with the aid of a surfactant, and monoethylenically unsaturated monomers to be copolymerized are incorporated in the polyol emulsion while conditions of elevated temperature and catalysis are maintained to cause polymerization of said monomers in association with said polyol. The polyol is used in an amount of about 1% to about 25%, based on the weight of the materials which are copolymerized, and the monomers desirably include from about 0.5% to about 10% on the same basis of a reactive monomer, such as isobutoxymethyl acrylamide.

7 Claims, No Drawings
}

EMULSION POLYMERIZATION IN WATER-INSOLUBLE POLYOL

DESCRIPTION

1. Technical Field

This invention relates to aqueous emulsion copolymerization and to thermosetting latex coating compositions produced thereby.

2. Background Art

Conventional aqueous emulsion copolymerization produces a high molecular weight copolymer having limited capacity to coalesce and wet pigment and substrate. It is also difficult to obtain gloss coatings from the conventional latex compositions or to introduce thermosetting capacity into the copolymer. This invention seeks to improve these inadequacies in the prior latex coating compositions.

DISCLOSURE OF INVENTION

In accordance with this invention, a water-insoluble polyhydric alcohol (commonly termed a polyol) is emulsified into water with the aid of a surfactant to provide droplets of liquid polyol in an aqueous continuum. Despite water-insolubility, the affinity of the hydroxy groups in the polyol for the continuous water phase of the emulsion allows fine particle size to be easily provided. This allows particle size control in the final latex without depending upon monomer selection and proportion.

Monoethylenically unsaturated monomers to be copolymerized are incorporated in the polyol emulsion and conditions of elevated temperature and catalysis causing polymerization are applied to cause the monomers to become polymerized in association with the polyol. The monomers are desirably premixed and the mixture is added incrementally to the polyol emulsion which is hot and which contains the catalyst to enable the monomers to be progressively associated with the polyol and polymerized in association therewith. This forms copolymer particles containing dissolved polyol and the particle size of the final latex can be controlled to a considerable extent by the particle size of the polyol emulsion. As a result, one feature of this invention is the capacity to provide latex coating compositions having a small average particle size without regard to the monomer selection. The fine particle size and the presence of the polyol provides emulsions which possess superior capacity to coalesce on deposition, they wet the pigment better in pigmented coatings, and they are less subject to pinholing and crawling. The polyol contributes in various ways to these improved results, including the fact that its presence lowers molecular weight. Lower molecular weight can also be achieved by the presence of mercaptan in the monomer mixture which is polymerized, but mercaptan introduces odor and related problems which one can avoid, if desired, in this invention.

In preferred practice, the monomers which are copolymerized include a monomer carrying a reactive group capable of reacting with the hydroxy groups of the polyol during a subsequent bake of the latex after it has been coated upon a substrate. In this way the polyol not only provides the advantages noted before, but it also provides an inexpensive source of hydroxy functionality to facilitate cure. Also, some reaction may occur during the copolymerization, and this assists in achieving a good association of the copolymer with the polyol.

When the reactive monomer is omitted, the latex can still be modified and used to deposit thermosetting coatings. This is possible because the polyol is of significant molecular weight and complexity to enable water-insolubility, so it becomes intertwined with the copolymer molecules and the complex mixture (which may include some grafting) can be cured by incorporating a small proportion of a phenoplast or aminoplast resin into the aqueous phase of the latex.

The polyol is preferably liquid at room temperature, but if it is not a liquid, it must be liquefiable at the moderate temperature (40° C. to 90° C.) normally used for emulsion polymerization. The number of hydroxy groups in the polyol is of secondary significance. Dihydric alcohols, such as the addition reaction product of propylene oxide with a bisphenol, such as bisphenol A, are particularly effective and are preferred. However, trihydric alcohols, such as the addition reaction product of ethylene oxide with trimethylol propane having a high enough molecular weight to provide water-insolubility, such as an average molecular weight of about 1700, are also useful. Tetrahydric alcohols such as the addition reaction product of pentaerythritol with ethylene oxide having a molecular weight of about 600 are also useful. Significant water-insolubility to enable a small amount of polyol to be emulsified into a large amount of water is essential.

It is preferred to use an adduct of a polyhydric alcohol with an alkylene oxide to provide a polyether which is insoluble in water. The greater the molecular weight, the more hydroxy groups, and the longer the chain length of the alkylene oxide, the greater the water-insolubility. Ethylene oxide, 1,2-propylene oxide and a butylene oxide are all useful.

The proportion of water-insoluble polyol must be small in comparison with the unsaturated monomers which are subjected to copolymerization. On this basis, about 1% to about 25% polyol can be used, preferably from 2% to 15%, based on the weight of the materials which are copolymerized. As previously indicated, the small amount of polyol does a big job for it helps to determine the particle size of the latex, it moderates the molecular weight of the emulsion polymer, it enhances the wetting characteristics and coalescing characteristics of the latex particles, and it provides hydroxy groups to participate in a thermosetting cure.

The proportion of monomer carrying a reactive group capable of reacting with the hydroxy groups of the polyol is also small, and can vary from about 0.5% to about 10%, preferably from 1% to 5% of the weight of the materials being polymerized. Since the copolymer particles have much greater molecular weight than is obtained by polymerization in solvent solution, less cross-linking is required for an effective cure. As is conventional, cure is measured by noting an increase in the resistance of the coating to removal with organic solvent, typically methyl ethyl ketone.

It is also preferred to use less reactive monomer than polyol, a weight ratio of 1:1.5 to 1:3 being appropriate, and this provides a desirable economy.

The monomers which are copolymerized consist essentially of monoethylenically unsaturated monomers at least about 80% of which are nonreactive. This term denotes that the monomers do not react under the conditions of polymerization and subsequent cure except through their ethylenic unsaturation. This usually means the absence of any functional group other than the single polymerizable ethylenic group. These nonreactive monomers are illustrated by styrene, vinyl toluene, methyl methacrylate, methyl acrylate, and $C_2$–$C_8$ alkyl acrylates and methacrylates, such as ethyl acrylate and isobutyl methacrylate. Vinyl acetate and acrylonitrile are also useful.

The reactive monomer is preferably an ether-blocked N-methylol functional monoethylenic compound, such as isobutoxymethyl acrylamide. The isobutyl ether group is particularly preferred because of its hydrolytic stability and resistance to unblocking at the moderate temperatures characteristic of emulsion polymerization. However, isobutyl alcohol is driven off on subsequent baking which generates N-methylol functionality for cure. The isobutyl ether is illustrative of $C_1$–$C_8$ alcohol ethers, preferably $C_2$–$C_4$ alkyl ethers. Similarly, the preferred N-methylol group can be replaced by N-$C_2$–$C_8$ alkylol and the acrylamide portion of the monomer can be replaced by other monoethylenic entities, such as methacrylamide and other amides, and allyl carbamate and the like. If the N-methylol monomer is unblocked, some reaction will occur during polymerization, so the proportion of use must be minimized.

Up to about 6% of monoethylenic monomers enhancing the stability of the latex may also be present. In preferred practice from 0.5% to 2% of a carboxy-functional monomer, such as acrylic acid, methacrylic acid, crotonic acid, itaconic acid or maleic acid is present. During or after copolymerization ammonia or an amine may be added to enhance the stability of the latex. On the other hand, a correspondingly small amount of an amine monomer, like dimethyl aminoethyl acrylate, can be used and an acid, like acetic acid, can be added for stability.

The carboxyl-functional monomer is also reactive with the hydroxy groups of the polyol and with the N-methylol groups of the copolymer, and thus aid in the curing reaction. Similarly, the monomers which are copolymerized may include up to about 5% of an hydroxy monomer, such as an hydroxy alkyl acrylate or methacrylate in which the alkyl group contains from 2–4 carbon atoms, typically 2-hydroxyethyl acrylate.

The surfactants which can be used to emulsify the polyol are subject to wide variation, anionic, nonionic surfactants being preferred, including mixtures thereof. Anionic surfactants are especially useful herein for obtaining fine particle size. The preferred anionic surfactants are sodium dodecyl benzene sulfonate and sodium lauryl sulfate. Nonionic surfactants which may be used are illustrated by an octyl or nonyl phenol adducted with from 8 to 40 mols of ethylene oxide per mol of the phenol.

In the preferred emulsion polymerization, the selected proportion of polyol is emulsified into enough water to provide a latex containing from 30% to 65% solids, preferably from 35% to 60% solids, polymerization catalyst is added to the emulsion which is heated to polymerization temperature, and the monomers to be copolymerized are premixed and added incrementally to the hot polyol emulsion.

BEST MODE FOR CARRYING OUT THE INVENTION

Example 450 grams of deionized water, 60 grams of a 30% water solution of sodium lauryl sulfate, 50 grams of propylene oxide adduct of bisphenol A (Polyol 565 of Dow Chemical Co. may be used) and 6 grams of sodium dodecyl benzene sulfonate are emulsified with high speed agitation to form a milky emulsion which is charged into a reactor together with 900 grams of deionized water, 1 gram of sodium dodecyl benzene sulfonate and 6.7 grams of ammonium persulfate catalyst.

There is then separately premixed 600 grams of methyl methacrylate, 480 grams of butyl acrylate, 30 grams of isobutoxymethyl acrylamide, 15 grams of acrylic acid and 3 grams of tertiary dodecyl mercaptan. This monomer mixture is then added to the reactor over a period of 2 hours after the reactor contents have been heated to 70° C. The temperature is maintained at 70° C.–73° C. while the monomers are added and for 30 minutes thereafter to insure conversion of monomer to copolymer.

After completion of copolymerization, the emulsion product is cooled to 35° C. and a mixture of 20 grams of dimethyl ethanol amine, 20 grams of butyl alcohol and 20 grams of deionized water are added to stabilize the emulsion which is then cooled and strained to form a milky emulsion of very fine particle size having a solids content of 45.6% and an acid value of 15.6.

100 grams of the copolymer emulsion of the above emulsion containing 45.6 grams of copolymer solids are slowly added with agitation to 9.12 grams of hexamethoxymethyl melamine dissolved in 50 grams of n-butanol. The resulting coating composition is applied by a wire wound rod onto aluminum panels (24 gauge) to form a film having a thickness of 0.8 mil. After baking 30 seconds in a 450° F. oven, the following film properties are obtained.

| | |
|---|---|
| Gloss (60° Glossmeter) | 92 |
| Pencil Hardness | F |
| Metal Mark Resistance | Excellent |
| Solvent Resistance (methyl ethyl ketone) | Pass 100 rubs |
| Reverse Impact | 36 in/lbs (no crack) |

INDUSTRIAL APPLICATION

The latex coating compositions of this invention are particular adapted for reverse roll application to aluminum siding and as a coating for tinplate for the exterior of sanitary cans. They are also useful for air drying paints where the superior pigment wetting characteristics provides many advantages.

What is claimed is:

1. A method of forming a latex coating composition comprising, forming an aqueous emulsion of liquid droplets of water-insoluble propylene oxide polyol adduct of a bisphenol with the aid of a surfactant, incorporating monoethylenically unsaturated monomers to be copolymerized in said polyol emulsion, at least about 80% of said monoethylenically unsaturated monomers being nonreactive, and maintaining conditions of elevated temperature and catalysis causing polymerization of said monomers to cause said monomers to polymerize in association with said polyol, said polyol being used in an amount of about 1% to about 25%, based on the weight of the materials which are copolymerized.

2. A method as recited in claim 1 in which said monomers are premixed and the mixture of monomers is added incrementally to said polyol emulsion.

3. A method as recited in claim 1 in which said monomers include from about 0.5% to about 10%, based on the weight of the materials being copolymerized, of a monomer carrying a reactive group capable of reacting with the hydroxy groups of said polyol during a subsequent bake of the latex after it has been coated upon a substrate.

4. A method as recited in claim 1 in which said surfactant is an anionic surfactant and said monomers include from 0.5% to 2% of a carboxy-functional monomer.

5. A method as recited in claim 1 in which said polyol is used in an amount of from 2% to 15% of the materials which are copolymerized, and said surfactant is anionic.

6. A method as recited in claim 3 in which the weight ratio of said polyol to monomer carrying a reactive group is from 1:1.5 to 1:3.

7. A method as recited in claim 6 in which the polymerization is carried out at a solids content of from 30% to 65% and at a temperature of from 40° C. to 90° C.

* * * * *